April 5, 1932. E. R. WOLFERT 1,852,551
REGULATOR SYSTEM
Filed Feb. 6, 1929
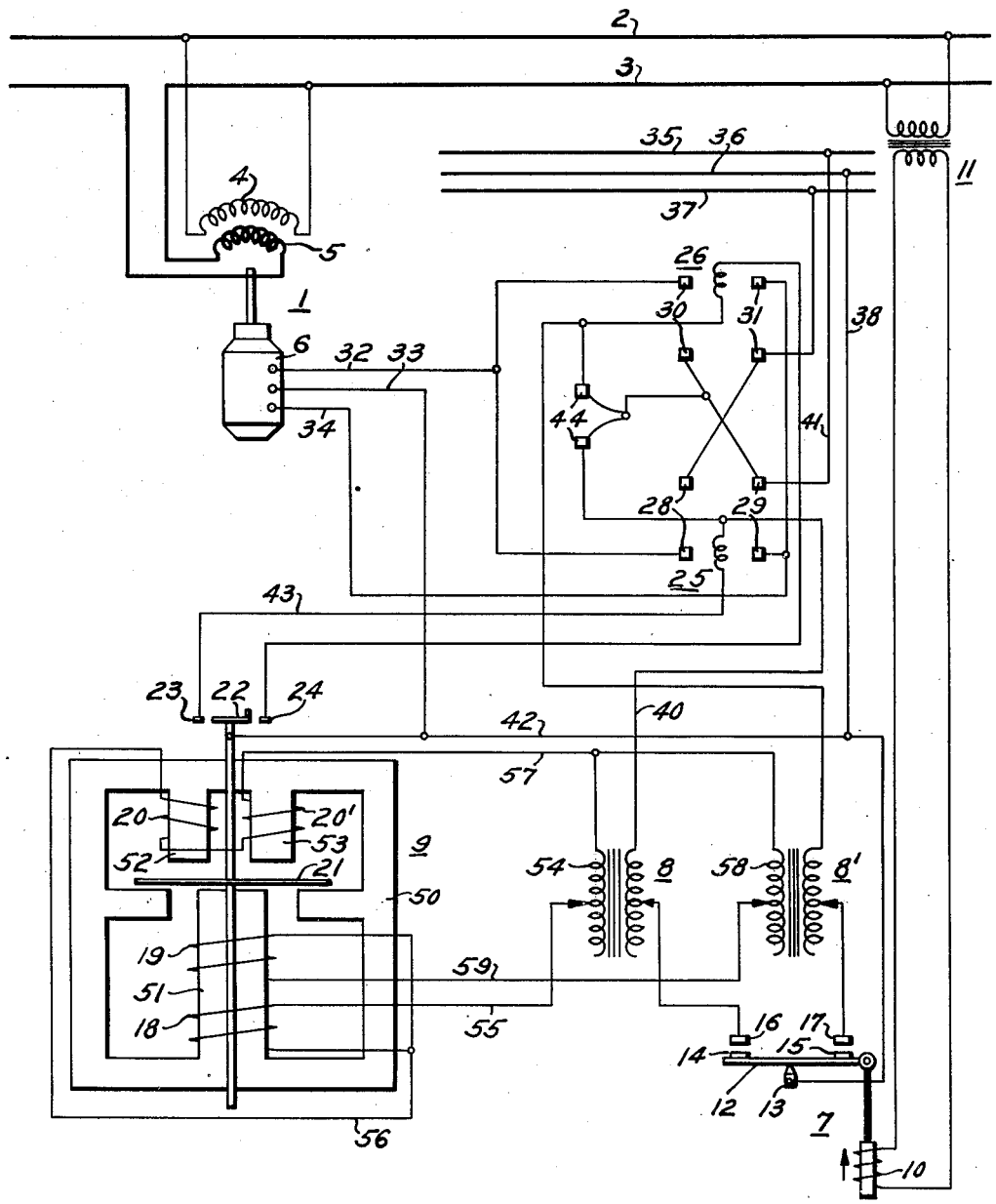
INVENTOR
Edward R. Wolfert.
BY
ATTORNEY Patented Apr. 5, 1932

1,852,551

UNITED STATES PATENT OFFICE

EDWARD R. WOLFERT, OF WILKINSBURG, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed February 6, 1929. Serial No. 337,903.

My invention relates to regulator systems, and has special relation to apparatus for regulating the voltage, or other electrical quantity, of alternating current circuits.

In a motor driven feeder regulator of the induction type, the operation of the motor is controlled by means of a relay commonly designated as a contact-making voltmeter. Variations in voltage of the circuit, with which the regulator is associated, cause the contact-making voltmeter to close the one, or the other, of the two motor circuits, and to thereby so operate the motor, and the induction regulator, in the one or the other direction, to increase or decrease the voltage, as required.

In certain applications, such, for example, as where electric furnaces are connected to the power circuit, the voltage may vary considerably from the desired value, and such changes may exist for varying periods of time. Temporary voltage variations may occur which alternately swing above and below the desired value, and, if a regulator responds too promptly to such variations a "pumping action" may result and cause the alternate voltage swings to increase, thus aggravating the condition. Also, with the character of the load indicated, variations in the voltage from its desired value are frequently temporary in character, and therefore do not require correction by the action of the regulator. In such a system, it is desirable that the induction regulator should not be immediately responsive to voltage variations, because of the undesirable regulating characteristics described above, and also because too frequent operation of the regulator causes excessive wear on the regulator and auxiliaries.

One object of my invention is, therefore, to provide a regulator system that shall be accurate for regulating an electrical quantity of a power circuit, but which shall not be immediately responsive to variations of the quantity to be regulated from a desired value.

Another object of my invention is to provide a regulator system that shall be sensitive to changes in the quantity to be regulated, should the variations of the quantity to be regulated be maintained for a predetermined time, but shall not be responsive to changes thereof of short duration.

My invention will be better understood by reference to the accompanying drawing, in which the single figure is a diagrammatic view of the apparatus and circuits comprising one embodiment of my invention.

Referring to the drawing, an induction regulator 1 is provided for regulating the voltage of a circuit comprising conductors 2, 3. A primary coil 4 of the regulator is connected in parallel circuit relation to, and a secondary coil 5 is connected in series circuit relation with, the conductors 2, 3 of the circuit to be regulated. An electric motor 6 is provided for changing the relative positions of the primary and secondary coils of the induction regulator. The motor 6 is actuated in accordance with the operation of circuit controlling relays 25 and 26, that are selectively energized by the operation of a time delay relay 9, that is, in turn, controlled by a relay, or contact-making voltmeter 7, actuated in accordance with an electrical quantity, such as voltage, of the circuit being regulated.

The relay, or contact-making voltmeter 7, comprises a lever 12, actuated by an electromagnet 10 and movably supported by the pivot 13. This lever carries movable contact members 14 and 15, which cooperate, respectively, with stationary contact members 16 and 17, to close circuits which energize the relay 9. The electromagnet 10 is provided with a coil that is energized from the transformer 11, in accordance with the voltage across the circuit conductors 2, 3. Engagement of contact members 14 and 16, or 15 and 17, closes a circuit through the primary winding of one of the two transformers 8 or 8', connecting it to conductors 35 and 36 of an auxiliary supply circuit, represented by conductors 35, 36 and 37. The energization of the one or the other of the transformers 8 or 8' causes one of the windings 19 or 18 and the winding 20 and 20' of the relay 9 to be energized and to effect its operation in the one or in the other direction, and after an interval of time, to operate the one or the other of the relays 25 or 26. The transformers 8 and 8' permit the use of a voltage on the windings of relay 9 that is less than the voltage of the conductors 35, 36, 37. By varying the tap connections to those transformers the time element of the relay 9 may be adjusted.

The relay 9, which is shown as being of the induction type, comprises a magnetizable core structure, having an outer ring 50, of magnetic material, and a projection 51, extending centrally upwardly therefrom, together with two projections 52 and 53, extending downwardly, from the upper part of the magnetic structure, on either side of the vertical axis thereof. Windings 18 and 19 are provided on the upwardly extending projection 51, and the windings 20 and 20' are provided upon the projections 52 and 53, respectively. A movable disk 21, of copper, or other suitable material, is rotatably mounted between the ends of the pole pieces, or projections of the magnetic circuit, and adapted to move in the one or in the other direction, according to the direction of the energization of the magnetic circuit of the relay, and to correspondingly actuate a contact member 22, that cooperates with the one or the other of two stationary contact members 23 and 24. The positions of these stationary contact members are adjustable, in order that the length of time required to effect an engagement of contact member 22, with either of the stationary contact members 23 or 24 may be varied. The relay 9 is normally so biased that the contact member 22 is held out of engagement with the contact members 23 and 24 when the relay windings are deenergized.

Upon the energization of transformer 8, current flows from the secondary winding 54 thereof, through conductor 55, winding 18, conductor 56, windings 20 and 20', and conductor 57 to the winding 54, energizing the relay 9 to operate in one direction. Upon the energization of transformer 8', current flows from the secondary winding 58 thereof, through conductor 59, coil 19, conductor 56, windings 20 and 20', and conductor 57 to the winding 58. The relation of the coils 18 and 19 is such, that they produce flux in opposite directions, which combine with the flux from the coils 20 and 20' to produce opposite directions of rotation of the member 21.

The engagement of the contact member 22, with one of the stationary contact members 23 or 24, of the relay 9, causes an energizing circuit to be completed through the operating coils of one of the relays 25 and 26, thus actuating it to a circuit closing position. The relay 25, when operated, closes a circuit through the cooperating pairs of contact members 28, and 29, causing the motor 6 to operate in one direction. The relay 26, when operated, closes a circuit through the contact members 30, and the contact members 31, causing motor 6 to operate in the opposite direction. The motor 6 is illustrated as a three-phase motor, energized from a separate three-phase source of supply, the motor leads 32, 33 and 34 being connected to the alternating current source 35, 36 and 37 in a particular phase relation, in accordance with the operation of the relays 25 and 26.

The operation of the system is as follows: If the voltage of the circuit 2, 3 decreases with respect to its desired value, the energization of electromagnet 10 will decrease, and cause the core thereof to move downwardly, thus actuating the lever 12 to effect engagement of the contact members 14 and 16. This will complete a circuit through the primary winding of the tap-changing transformer 8. This circuit leads from the conductor 36, of the alternating current power source, through conductor 38, lever 12, contact members 14 and 16, through the primary coil of the tap-changing transformer 8, through conductor 40, limit switch 44, and conductor 41, to conductor 35 of the alternating current power source.

When the primary coil of the tap-changing transformer 8 is energized, current flows from the secondary coil 54 of the transformer through the coils 18, 20 and 20' of the relay 9, thus causing the element 21 and the contact member 22 to rotate. If the voltage variation continues for a predetermined time, thus maintaining the contact members 14 and 16 in engagement, the movable contact member 22 will engage the stationary contact member 23, thereby completing a circuit through the operating coil of the relay 25. This circuit leads from the conductor 36 of the alternating current power source, through conductor 38, conductor 42, contact members 22 and 23, conductor 43, the operating coil of the relay 25, limit switch 44 and conductor 41, to conductor 35 of the alternating current power source.

The relay 25 now operates and effects engagement of the cooperating pairs of contact members 28 and 29, thus completing the circuit to the motor 6, and causing it to change the position of the winding 5 relative to winding 4, and secure the correction required to maintain the desired voltage on the circuit 2, 3.

If the voltage of the circuit 2, 3 increases above its desired value, the core of the electromagnet 10 will move upwardly, effecting engagement of the contact members 15, and 17 and completing a circuit through the primary winding of the tap-changing transformer 8'. A current will then flow through the windings 19, 20 and 20', that are connected in series circuit relation with the secondary winding 58, of the tap changing transformer 8'. The movable disk 21 will then be actuated to rotate in a direction opposite to that described above, and, if continued for a predetermined time, effect the engagement of the contact members 22 and 24. The engagement of the contact members 22 and 24 will complete a circuit through the operating coil of the relay 26, and actuate it to a circuit closing position. This operation of the relay 26 will effect engagement of the cooperating pairs of contact members 30 and 31, thus completing a circuit through the motor 6, and causing it to operate in a direction to raise the voltage of the circuit 2, 3 to the desired value.

While I have described my system as applied to the control of an induction regulator, it is apparent that it may be used to control other forms of regulators, and it may be connected to be responsive to current changes, or to any other electrical quantity of the controlled circuit.

It will be evident, from the foregoing description, that the disclosed system for regulating an electrical quantity of a power circuit does not immediately correct for changes in the electrical quantity regulated, but makes this correction when the variation in the electrical quantity is maintained for a predetermined time.

Many modifications of the described embodiment of my invention within the spirit thereof, will occur to those skilled in the art, and, I do not wish to be limited other than by the scope of the appended claims.

I claim as my invention:

1. In a regulator system, an electric circuit, regulator means connected to said circuit for varying an electrical quantity thereof, electro-responsive means for operating said regulator means, a plurality of relays for controlling the energization of said electro-responsive means, contact-making means actuated in accordance with the voltage of said circuit for controlling the energization of said relays, means controlled by said contact-making means for introducing a time delay between the operation of said contact-making means and one of the said relays, and means for adjusting the value of the time delay.

2. In a regulator system, an electric circuit, regulator means connected to said circuit for varying an electrical quantity thereof, and operating means therefor, means for controlling the operation of said operating means comprising a primary relay responsive to variations of the voltage of said circuit, a secondary relay controlled thereby, means for introducing a time delay of predetermined value, between the operation of the primary relay and the secondary relay, and means for adjusting the predetermined value of the time delay.

3. In a regulator system, an electric circuit, an induction regulator connected to said circuit for varying an electrical quantity thereof, an electric motor for operating said induction regulator, a secondary relay for for controlling the operation of said electric motor, a primary relay actuated in accordance with variations in an electrical quantity of said circuit for controlling the operation of the secondary relay, means for delaying the operation of the secondary relay for a predetermined time after the response of the primary relay to variations in an electrical quantity of said electric circuit, and means for adjusting the value of the predetermined time.

4. In a regulator system, an electric circuit, an induction regulator connected to said circuit for varying an electrical quantity thereof, an electric motor for operating said induction regulator, a secondary relay for controlling the operation of said electric motor, a primary relay actuated in accordance with variations in an electrical quantity of said circuit, for controlling the operation of the secondary relay and comprising cooperating contact members, an electric relay of the induction type for delaying the operation of the secondary relay after the operation of the primary relay.

5. In a regulator system, an electric circuit, an induction regulator connected to said circuit for varying an electrical quantity thereof, an electrical motor for operating said induction regulator, a secondary relay for controlling the operation of said electric motor, a primary relay actuated in accordance with variations in an electrical quantity of said circuit for controlling the operation of the secondary relay, contact members actuated by said primary relay, an electric relay of the induction type for delaying the operation of the secondary relay for a predetermined time after the actuation of the primary relay, comprising a magnetizable core member, a movable contact member actuated thereby, two stationary contact members cooperating therewith, and two windings so disposed on the core member that, when energized, they effect operation of the movable contact member in opposite directions and means for adjusting the value of the predetermined time delay.

In testimony whereof, I have hereunto subscribed my name this 4th day of February, 1929.

EDWARD R. WOLFERT.